United States Patent
Felix

(10) Patent No.: US 8,723,577 B2
(45) Date of Patent: May 13, 2014

(54) SPREADING A CLOCK SIGNAL

(75) Inventor: Steve Felix, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/554,716

(22) Filed: Jul. 20, 2012

(65) Prior Publication Data

US 2013/0021075 A1    Jan. 24, 2013

(30) Foreign Application Priority Data

Jul. 22, 2011    (GB) .................................. 1112634.9

(51) Int. Cl.
*H03K 3/00* (2006.01)
(52) U.S. Cl.
USPC ............................................. 327/291
(58) Field of Classification Search
USPC ............................................. 327/291
See application file for complete search history.

(56) References Cited

U.S. PATENT DOCUMENTS

| | | | |
|---|---|---|---|
| 5,699,005 A | * | 12/1997 | Menkhoff et al. ............ 327/292 |
| 6,144,242 A | | 11/2000 | Jeong et al. |
| 2009/0059324 A1 | | 3/2009 | Nagase et al. |

FOREIGN PATENT DOCUMENTS

WO    01/71918 A1    9/2001

OTHER PUBLICATIONS

Patents Act 1977: Search Report Under Section 17(5), GB Application No. 1112634.9, Nov. 9, 2012, 3 pages.

* cited by examiner

*Primary Examiner* — Daniel Rojas

(57) ABSTRACT

Method, circuitry and device for spreading a clock signal in which the clock signal is received at an input of a variable delay line, the clock signal having been generated by a clock signal generator. In one embodiment, for each edge of the clock signal, the delay introduced by the variable delay line is set in accordance with a stored delay value. For each of a plurality of consecutive edges of the clock signal, the stored delay value is either incremented or decremented based on a randomly generated value for that edge. A spread version of the clock signal is output from the variable delay line, wherein each edge of the spread version of the clock signal is delayed by the respective delay that is set for that edge of the clock signal.

25 Claims, 15 Drawing Sheets

SPREADING A CLOCK SIGNAL

REFERENCE TO RELATED APPLICATION

This application claims priority from GB Application No. 1112634.9 filed on Jul. 22, 2011, entitled "SPREADING A CLOCK SIGNAL" commonly assigned with the present invention and incorporated herein by reference.

TECHNICAL FIELD

The present invention relates to spreading a clock signal.

BACKGROUND

Clock signals are used throughout computer systems to facilitate the correct timing of events within the computer system. For example, if a sequence of events must occur in a particular order or must occur simultaneously, then clock signals may be used to ensure that the events occur at the correct timings.

A clock signal having a constant period (or "time period") is useful in providing an accurate measure of time in a computer system. The time interval between consecutive rising edges is constant for a clock signal with a constant (or "uniform") period. In the frequency domain, a clock signal having a constant period will have a narrow peak of high-amplitude at the fundamental frequency corresponding to the inverse of the period of the clock signal. The clock signal will also have a series of other narrow peaks of lower amplitude than the peak of the fundamental frequency, which correspond to harmonics of the clock signal. When the clock signal has a constant period, the energy of the harmonics is contained within narrow bandwidths and as such the harmonics have a relatively high Power Spectral Density (PSD) (which has units of Power/Hz).

The frequency of the clock signal can be set such that it will not interfere in particular frequency bands which may be reserved for purposes other than for clock signals. However, the harmonics of the clock signal may fall into a reserved frequency band and cause interference within the reserved frequency band. For example, the clock signal may be used within a device which communicates using the Global System for Mobile Communications (GSM) standard. According to the GSM standard the energy of received signals within particular frequency channels (which are typically of the order of 100 kHz in bandwidth) is measured in order to correctly receive and interpret the received signals. The signals are received at the device over a wireless channel and may have a low signal strength, making them very susceptible to interference from clock harmonics. If there is too much interference from such a harmonic in a particular radio channel, then the sensitivity of the receiver to a radio signal could be degraded unacceptably.

As is known in the art, a phase locked loop (PLL) may be used to generate a clock signal within a device. PLLs use a voltage controlled oscillator (VCO) and a feedback mechanism to set the frequency of the generated clock signal. Spread spectrum frequency dithering (SSFD) is a method by which the voltage supplied to a VCO within a PLL can be "dithered", that is, varied slightly around the usual voltage supplied to the VCO. In this way the clock signal generated by the PLL will have a period which varies slightly (or "dithers") around the usual clock period. Whilst this dithering can reduce the accuracy of the clock signal for use in correctly timing events within a computer system, the dithering will spread out the peaks of the clock signal in the frequency domain. This means that the peak strengths of the fundamental frequency and of the harmonics of the clock signal will be reduced and the peaks will be spread over a larger frequency bandwidth. By spreading the peaks over a bandwidth which is larger than the bandwidth of the receive channels in a GSM device, the PSD of the harmonics of the clock signal within each receive band is reduced, and therefore the effect of the interference resulting from the harmonics of the clock signal can be reduced.

SUMMARY

According to a first aspect, the disclosure provides a method of spreading a clock signal. In one embodiment, the method includes: (1) receiving the clock signal at an input of a variable delay line, the clock signal having been generated by a clock signal generator, (2) for each edge of the clock signal, setting the delay introduced by the variable delay line in accordance with a stored delay value, (3) for each of a plurality of consecutive edges of the clock signal, either incrementing or decrementing the stored delay value based on a randomly generated value for that edge and (4) outputting a spread version of the clock signal from an output of the variable delay line, wherein each edge of the spread version of the clock signal is delayed by the respective delay that is set for that edge of the clock signal.

According to a second aspect, the disclosure provides circuitry for spreading a clock signal. In one embodiment, the circuitry includes: (1) a variable delay line having: (1A) an input for receiving the clock signal, the clock signal having been generated by a clock signal generator, (1B) setting circuitry configured to set, for each edge of the clock signal, a delay introduced by the variable delay line in accordance with a stored delay value and (1C) an output for outputting a spread version of the clock signal, wherein each edge of the spread version of the clock signal is delayed by the respective delay that is set for that edge of the clock signal, and (2) a store configured to store the delay value. The circuitry is configured such that for each of a plurality of consecutive edges of the clock signal the stored delay value is either incremented or decremented based on a randomly generated value for that edge.

According to a third aspect, a device is provided. In one embodiment, the device includes: (1) a clock signal generator and (2) circuitry having (2A) a variable delay line and (2B) a store. The variable delay line including: an input for receiving the clock signal, the clock signal having been generated by a clock signal generator, setting circuitry configured to set for each edge of the clock signal, a delay introduced by the variable delay line in accordance with a stored delay value and an output for outputting a spread version of the clock signal, wherein each edge of the spread version of the clock signal is delayed by the respective delay that is set for that edge of the clock signal. The store is configured to store the delay value and the circuitry is configured such that for each of a plurality of consecutive edges of the clock signal the stored delay value is either incremented or decremented based on a randomly generated value for that edge.

BRIEF DESCRIPTION

Reference is now made to the following descriptions taken in conjunction with the accompanying drawings, in which.

DETAILED DESCRIPTION

Figure 1:
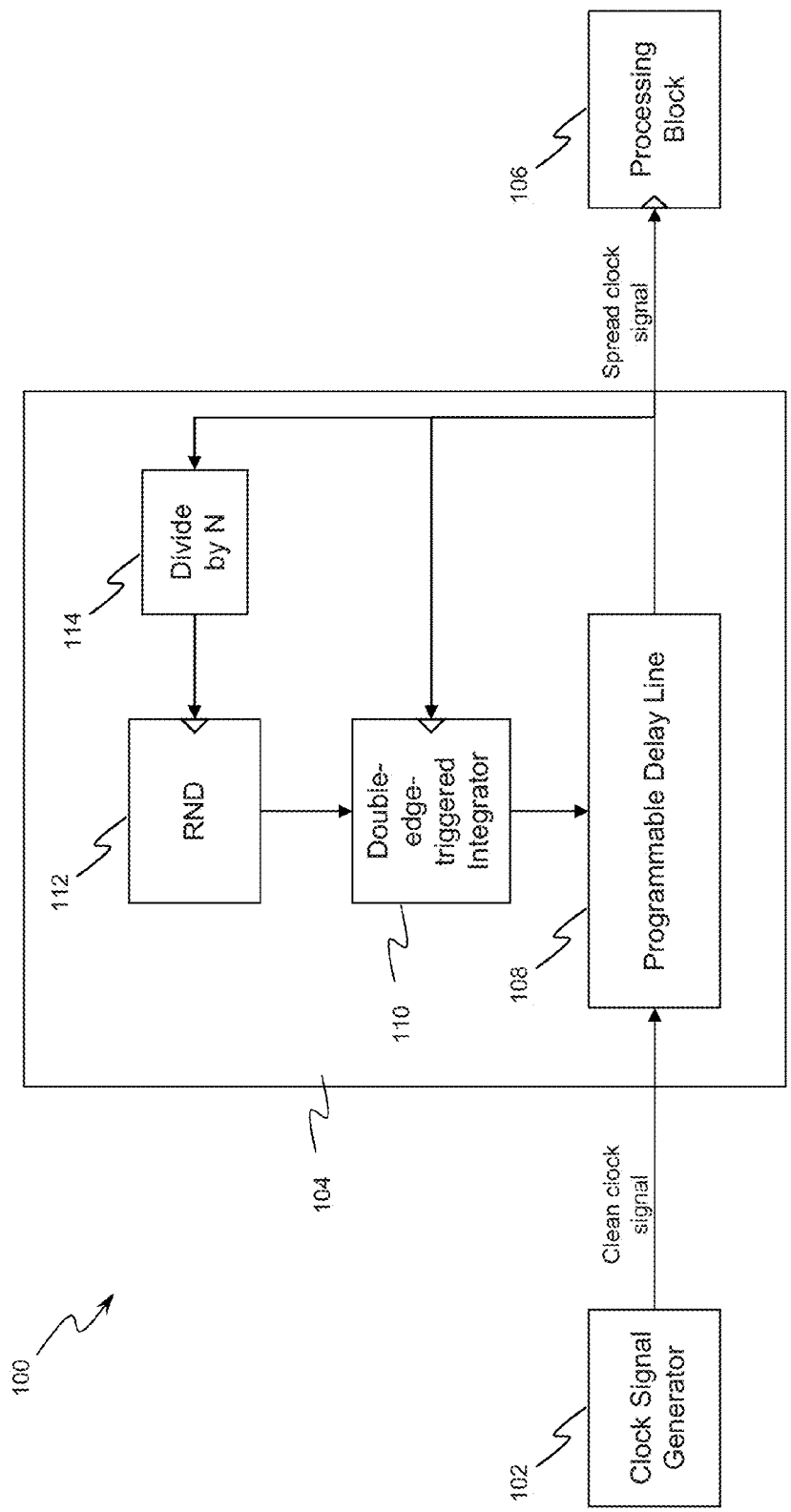
FIG. 1 illustrates a schematic diagram of an embodiment of a device constructed according to principles of the disclosure.

In some situations it can be difficult or detrimental to dither the voltage supplied to the VCO of a PLL used to generate a clock signal in a device, in order to spread the clock signal. Some blocks in the device may require a highly accurate clock signal that might not cause detrimental interference. For such blocks it would be beneficial to have a relatively low level of spreading of the clock signal. However, some other blocks in the device may tolerate a less accurate clock signal and may cause radio interference. For these other blocks it would be beneficial to have a relatively high level of spreading of the clock signal. Therefore, before applying the clock signal to a particular block in the device it would be beneficial to be able to adapt the spreading of the clock signal for that particular block. Furthermore, in some computer systems, a clock signal generator may be implemented as a separate block and it may be difficult to vary the voltage supplied to the VCO of a PLL of the separate clock signal generator block in order to achieve the SSFD described above. Furthermore, some clock signals can be driven out of a chip, for example a clock signal to a separate synchronous DRAM chip. Typically, such "off-chip" clock signals generate much stronger radio interference than clock signals that exist only on-chip.

The disclosure provides a method of spreading a clock signal that allows a clock signal which has already been generated by a clock signal generator to be spread, thereby outputting a spread version of the clock signal. In this way, the "clean" (i.e., unspread) version of the clock signal can be provided to some subsequent blocks which require the clean clock signal whilst the spread version of the clock signal can be provided to some other subsequent blocks which require the spread version of the clock signal. Furthermore, the method allows the clock spreading functionality to be implemented separately from the clock signal generating functionality. This greatly improves the flexibility of implementing a device which uses a spread clock signal. For example, the clock spreading functionality can be implemented in a block inserted between the clock signal generator and a subsequent block from which clock related RF interference may be generated (e.g., —a memory controller block which may drive the clock "off-chip" to an external synchronous DRAM chip). In this way the clock signal can be spread before being applied to the subsequent block to thereby reduce the amplitude of the harmonics of the clock signal. The amount of spreading of the clock signal can be adapted to suit each particular subsequent block by including multiple clock spreading blocks which may apply different levels of spreading to the clean clock signal before supplying a respective spread version of the clock signal to the subsequent blocks.

By basing the delay applied for clock edges on a randomly generated value (e.g., a random number) the PSD of the clock is substantially reduced at higher harmonics.

The plurality of consecutive edges may comprise each edge of the clock signal, such that the delay introduced by the variable delay line may be changed for each edge of the clock signal.

The method may further comprise randomly generating the randomly generated value for each of the plurality of consecutive edges of the clock signal. Alternatively, the method may further comprise randomly generating the randomly generated value for a set of the plurality of consecutive edges of the clock signal. In this alternative case, the set may comprises N of the plurality of consecutive edges of the clock signal, where N is greater than one and less than the value of the stored delay value corresponding to the maximum delay of the variable delay line. For example, the value of the stored delay value corresponding to the maximum delay of the variable delay line may be twenty and N may be six.

The stored delay value may be stored by an integrator. In an embodiment, the period of the clock signal received at the input of the variable delay line is greater than the delay introduced by the variable delay line. In some embodiments, the magnitude of a change to the delay of the variable delay line resulting from an increment or a decrement to the stored delay value does not exceed 3% of the period of the clock signal received at the input of the variable delay line.

The method may further comprise adjusting the magnitude of a change to the delay of the variable delay line that results from an increment or a decrement to the stored delay value. In some embodiments, for the plurality of consecutive edges of the clock signal, if the stored delay value corresponds to the maximum delay of the variable delay line then the stored delay value is decremented irrespective of the randomly generated value, and if the stored delay value corresponds to the minimum delay of the variable delay line then the stored delay value is incremented irrespective of the randomly generated value.

The disclosure also provides circuitry for spreading a clock signal. In one embodiment the circuitry includes a variable delay line and a store for storing a delay value. The variable delay line and the stored delay value may be implemented in the digital domain. Alternatively, the variable delay line and the stored delay value may be implemented in the analogue domain.

The circuitry may further comprise random value generating means for randomly generating a randomly generated value for each of the plurality of consecutive edges of a clock signal. Alternatively, the circuitry may further comprise random value generating means for randomly generating the randomly generated value for a set of the plurality of consecutive edges of the clock signal. The random value generating means may comprise a pseudo-random number generator, such that the randomly generated value is a pseudo-random number. The random value generating means may be a linear feedback shift register.

The store may be an integrator. The integrator may comprise a sequence of flip flops for storing the delay value as a thermometer code.

The variable delay line may comprise adjusting means for adjusting the magnitude of a change to the delay of the variable delay line that results from an increment or a decrement to the stored delay value. The variable delay line and the storing means may be implemented in the digital domain. Alternatively the variable delay line and the storing means may be implemented in the analogue domain.

FIG. 1 shows an embodiment of a device 100 constructed according to the principles of the disclosure. The device 100 comprises a clock signal generator 102, a clock spreading block 104 and a processing block 106. The clock spreading block 104 comprises a programmable delay line 108, an integrator 110, a random number generator 112 and a divider block 114. The clock signal generator 102 is configured to generate a clock signal. An output of the clock signal generator 102 is coupled to an input of the programmable delay line 108. An output of the programmable delay line 108 is coupled to a clock input of the processing block 106. The output of the programmable delay line 108 is also coupled to a clock input of the integrator 110 via the divider block 114 and to a clock input of the random number generator 112. An output of the random number generator 112 is coupled to an input of the integrator 110. An output of the integrator 110 is coupled to a control input of the programmable delay line 108.

Figure 2:
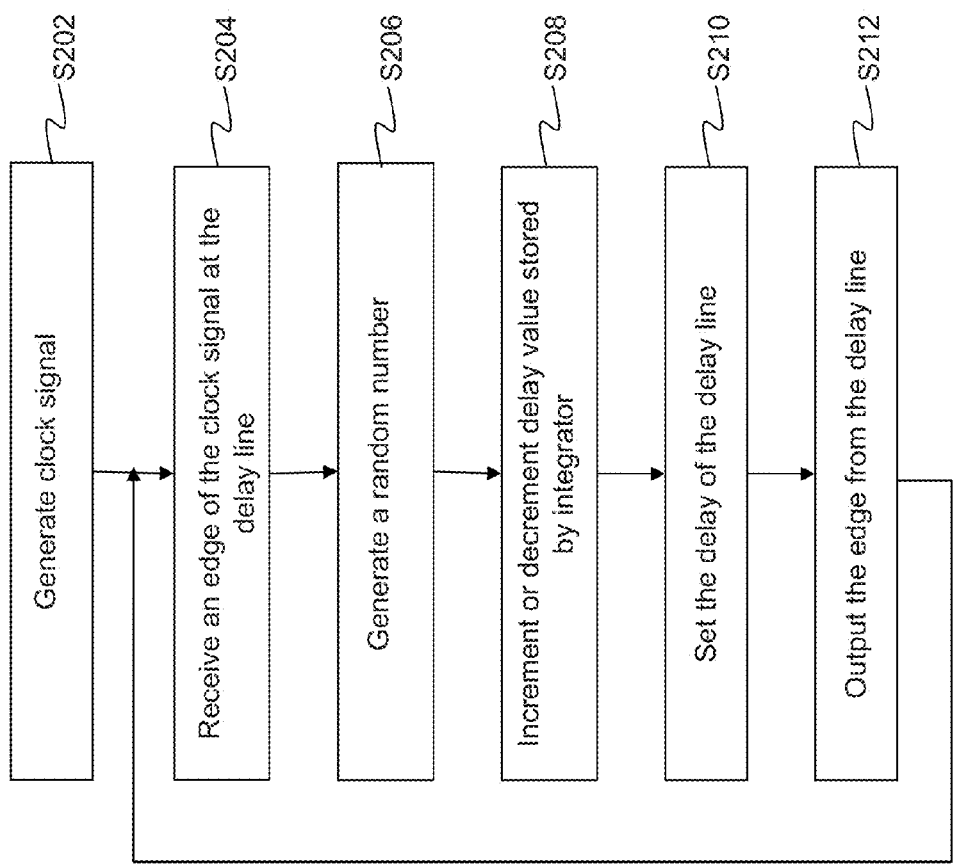
FIG. 2 illustrates a flow chart for an embodiment of a process of spreading a clock signal carried out according to principles of the disclosure.

Operation of the device 100 can be used to spread a clock signal as described in more detail below with reference to the flow chart shown in FIG. 2. In step S202 the clock signal generator 102 generates a clock signal. The clock signal generator 102 may be implemented in different ways as is known in the art. For example, the clock signal generator 102 may be implemented as a PLL as described above. The clock signal generated by the clock signal generator 102 is referred to herein as the clean clock signal. The clean clock signal generated by the clock signal generator 102 has a substantially constant period and can therefore be used in processing blocks (e.g. in USB processing blocks) in the device 100 which require a highly accurate clock signal.

The clean clock signal is output from the clock signal generator 102 and passed to the input of the programmable delay line 108. Rising and falling edges of the clock signal arrive at the programmable delay line 108 and pass through the programmable delay line 108, thereby being delayed. In step S204 an edge of the clock signal is received at the programmable delay line 108 from the clock signal generator 102.

The clock signal is used to clock the random number generator 112 (via the divider block 114) and the integrator 110. Although FIG. 1 shows that the clock signal output from the programmable delay line 108 is used to clock both the random number generator 112 and the integrator 110, in other embodiments, different versions of the clock signal may be used to clock the random number generator 112 and the integrator 110. For example, the clean clock signal or a clock signal from within the programmable delay line 108 may be used to clock one or both of the integrator 110 and the random number generator 112.

When the random number generator 112 is clocked, in step S206 it generates a random number. The term "random number" is used herein to include truly random numbers and also pseudo-random numbers. Truly random numbers are generated by a purely random process and cannot be predicted. Pseudo-random numbers exhibit statistical randomness while being generated by an entirely deterministic causal process. For the purposes of this disclosure, pseudo-random numbers can be used as if they were purely random numbers because we are not concerned with how the random numbers are generated, just that the random numbers exhibit statistical randomness. Indeed, since pseudo-random numbers are often simpler to generate than purely random numbers, in some embodiments the random number generator 112 is a pseudo-random generator. In embodiments as described below, the random number generator 112 is a Linear Feedback Shift Register (LFSR) which is implemented to generate and output pseudo-random numbers.

The random number output from the random number generator 112 is passed to the integrator 110. The integrator 110 stores a delay value which is used to set the delay of the programmable delay line 108. In step S208, when the integrator 110 is clocked, the delay value stored by the integrator 110 is either incremented or decremented. In this way when the integrator is clocked, the delay value stored by the integrator 110 changes, either upwards or downwards depending upon the random number generated by the random number generator 112. In the embodiment shown in FIG. 1 the random number generator 112 and the integrator 110 are clocked on every edge of the clock signal as it is output from the programmable delay line 108, such that the delay value stored in the integrator 110 will change for every edge of the clock signal. The total delay introduced by the programmable delay line 108 may be less than half the period of the clock signal, such that each edge will pass through the delay line and clock the random number generator 112 and the integrator 110 before the next edge of the clock signal arrives at the programmable delay line 108.

Changing the delay value between every clock edge advantageously provides for a better spreading of the clock signal (as compared to changing the delay value less frequently than on every clock edge). Ideally, to spread the clock signal perfectly, the delay would change continuously. However, since the clock signal is a square wave, most of the time it is either high or low following a very brief transition. Therefore, in some embodiments we emulate a continuously varying delay by changing the delay in discrete steps during each of these high/low periods, i.e., for every clock edge. If the delay were changed on alternate edges of the clock signal the spreading effect on the clock signal would be degraded significantly.

In some embodiments, the magnitude of the increments and decrements to the delay value are the same each time the integrator 110 is clocked. As an example, the random numbers generated by the random number generator 112 may either be 0 or 1 (with an equal probability), and when the random number received at the integrator 110 is a 1 then the delay value stored by the integrator 110 is increased by one, and when the random number received at the integrator 110 is a 0 then the delay value stored by the integrator 110 is decreased by one.

As shown in FIG. 1 the integrator 110 is a double-edge-triggered integrator, which means that it is clocked on every edge of the clock signal. This means that the integrator 110 is clocked twice in a period of the clock signal (i.e., on both the rising and the falling edges). In this way the delay value stored by the integrator 110 is changed on every edge of the clock signal.

The delay value stored by the integrator 110 is output to the programmable delay line 108 every time the integrator 110 is clocked. In step S210 the delay of the programmable delay line 108 is set in accordance with the delay value stored in the integrator 110. For example, the programmable delay line 108 may include a number of delay elements which each may, or may not, be switched to thereby add delay to the clock signal. The number of the delay elements which are switched to delay the clock signal can be set in dependence upon the delay value output by the integrator 110.

In step S212 the edge of the clock signal received at the programmable delay line 108 in step S204 is output from the programmable delay line 108. The edge of the clock signal has been delayed by the delay set in step S210. Since different edges will be delayed by different amounts in the programmable delay line 108, the time period of the output clock signal will fluctuate, i.e., not be constant. In this sense the clock signal output from the programmable delay line 108 is a spread clock signal. The spread clock signal is passed to the clock input of the processing block 106 and is used to clock the operations of the processing block 106. As an example, the spread clock signal can be used to access a memory block. In one embodiment, the memory block is required to be able to tolerate the variations in the clock signal frequency caused by the spreading of the clock signal. In some embodiments the frequency of the clock signal is changed by no more than ±6% due to the spreading of the clock signal. The memory (e.g., synchronous DRAM) must be capable of working with a clock signal having a frequency of $0.94F_0$ and $1.06F_0$, where $F_0$ is the frequency of the clean clock signal.

Figure 5:
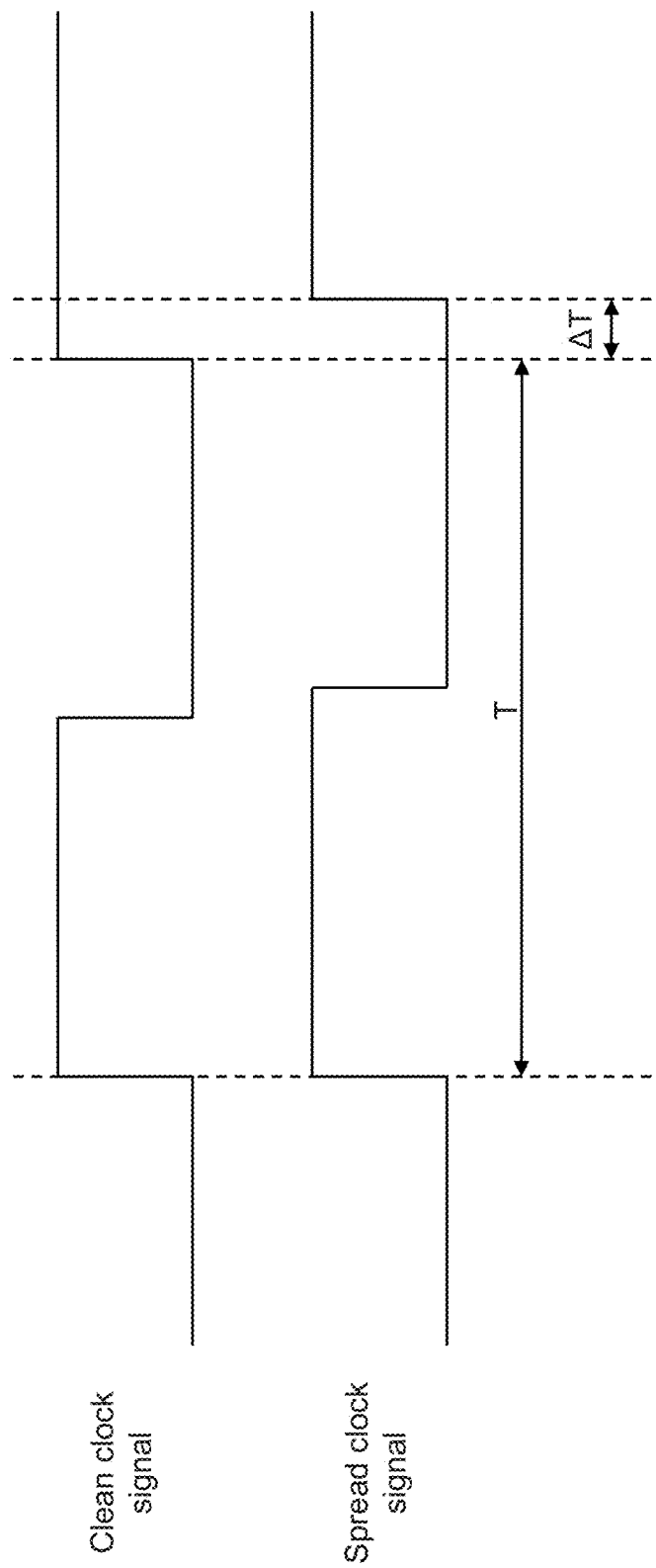
FIG. 5 illustrates a schematic representation of embodiments of a clean clock signal and a spread clock signal according to the principles of the disclosure.

The term "spreading" as used herein is known in the art. Spreading a clock signal means introducing small variations to the frequency (and therefore period) of the clock signal, such that the period of the clock signal is not constant. The magnitude of the variations in the period of the clock signal is much smaller (at least one order of magnitude smaller) than the period of the clock signal. In the example given above the magnitude of the variation in the period of the clock signal is 6% of the period of the clock signal. FIG. 5 is a schematic representation of a clean clock signal and a spread clock signal. FIG. 5 shows the value (e.g. the amplitude) of the clock signals as a function of time. The clean clock signal has a period T and a fundamental frequency component with a frequency $F_0$ (where $T=1/F_0$). It can be seen that the spread clock signal has a period which differs from that of the clean clock signal by $\Delta T$ in the example shown in FIG. 5. Although FIG. 5 is not drawn to scale, it is apparent from FIG. 5 that $\Delta T$ is much smaller than T. The ratio of $$\frac{\Delta T}{T}$$

must be kept small (e.g. no greater than 0.06) in order for the spread clock signal to be useful as a clock signal. If the period of the spread clock signal is allowed to vary significantly (e.g. by more than 6%) then use of the spread clock signal as a clock signal may cause timing errors and glitches in subsequent processing blocks.

Figure 3:
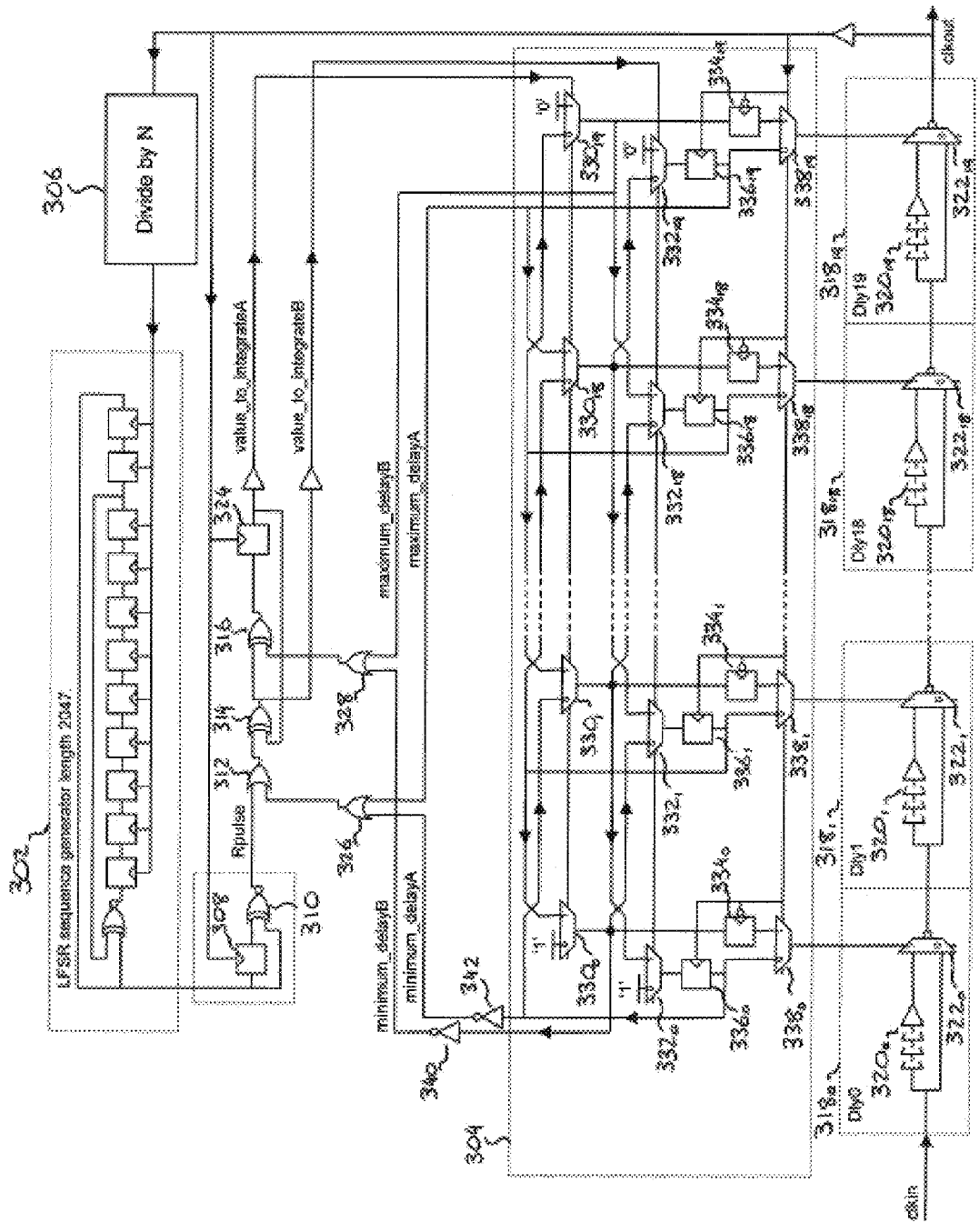
FIG. 3 illustrates a circuit diagram of an embodiment of circuitry for spreading a clock signal constructed according to the principles of the disclosure.

FIG. 3 is a circuit diagram of a clock spreading block for spreading a clock signal according to one embodiment. The random number generator 112 is implemented as an LFSR 302. In particular, the LFSR 302 shown in FIG. 3 is a LFSR sequence generator with a length of 2047. The LFSR includes a set of eleven flip flops and a XNOR gate, arranged as is known in the art, as shown in FIG. 3. The clock spreading block includes a double-edge-triggered integrator block 304, a divider block 306 and a sequence of delay elements $318_0$ to $318_{19}$, two flip flops 308 and 324, an XNOR gate 310, three OR gates 312, 326 and 328, two XOR gates 314 and 316 and two NOT gates 340 and 342. Each delay element 318 comprises a plurality of delay components 320, and a multiplexer 322.

The LFSR 302 is arranged to receive the spread clock signal output from the programmable delay line via the divider block 306. The divider block 306 is arranged to divide the clock signal output from the programmable delay line by a factor of N before passing the divided clock signal to the LFSR 302. The spread clock signal is coupled to clock inputs of the flip flops of the LFSR 302. The output from the LFSR 302 is coupled to a data input of the flip flop 308. An output of the flip flop 308 is coupled to a first input of the XNOR gate 310. The flip flop 308 is arranged to be clocked by the spread clock signal output from the programmable delay line. The output of the LFSR 302 is coupled to a second input of the XNOR gate 310. An output of the XNOR gate 310 (denoted "Rpulse") is coupled to a first input of the OR gate 312. An output of the OR gate 312 is coupled to a first input of the XOR gate 314. An output of the XOR gate 314 is coupled to a first input of the XOR gate 316 and also to the line marked "value_to_integrateB". An output of the XOR gate 316 is coupled to a data input of the flip flop 324. The flip flop 324 is arranged to be clocked by the spread clock signal output from the programmable delay line. The output of the flip flop 324 is coupled to the line marked "value_to_integrateA". The output of the flip flop 324 is also coupled to a second input of the XOR gate 314. The lines marked value_to_integrateA" and "value_to_integrateB" are coupled to the integrator block 304.

The integrator block 304 comprises twenty functional units which each comprise multiplexers 330, 332 and 338 and two flip flops 334 and 336. The multiplexers 330 are controlled by the value on the line marked "value_to_integrateA". The multiplexers 332 are controlled by the value on the line marked "value_to_integrateB". The multiplexers 338 are controlled by the value on the clock signal output from the programmable delay line.

In the first functional unit (denoted with subscript "0"), the multiplexer $330_0$ is arranged to receive a high signal at a low data input. The high signal may be set at 0.85V. The high data input of the multiplexer $330_0$ is coupled to the output of the flip flop $336_1$ of the next functional unit of the integrator block 304. An output of the multiplexer $330_0$ is coupled to a data input of the flip flop $334_0$ and to the NOT gate 340 and to a low data input of the multiplexer $332_1$ of the next functional unit. The flip flop $334_0$ is clocked by the clock signal output from the programmable delay line via an inverter. The output of the flip flop $334_0$ is coupled to a high data input of the multiplexer $338_0$. The multiplexer $332_0$ is arranged to receive a high signal at a low data input. The high signal may be set at 0.85V. The high data input of the multiplexer $332_0$ is coupled to the output of the multiplexer $330_1$ of the next functional unit of the integrator block 304. An output of the multiplexer $332_0$ is coupled to a data input of the flip flop $336_0$. The flip flop $336_0$ is clocked by the clock signal output from the programmable delay line. The output of the flip flop $336_0$ is coupled to a low data input of the multiplexer $338_0$ and to the NOT gate 342. The output of the multiplexer $338_0$ is used to control the delay element $318_0$ as described below.

In the intermediate functional units (denoted with subscripts "1" to "18") the multiplexer 330 is arranged to receive the output of the flip flop 336 of the preceding functional unit at a low data input. The high data input of the multiplexer 330 is coupled to the output of the flip flop 336 of the next functional unit of the integrator block 304. An output of the multiplexer 330 is coupled to a data input of the flip flop 334 of the corresponding functional unit and to the high data input of the multiplexer 332 of the preceding functional unit and to a low data input of the multiplexer 332 of the next functional unit. The flip flop 334 is clocked by the clock signal output from the programmable delay line via an inverter. The output of the flip flop 334 is coupled to a high data input of the multiplexer 338. The multiplexer 332 is arranged to receive the output of the multiplexer 330 of the preceding functional unit at a low data input. The high data input of the multiplexer 332 is coupled to the output of the multiplexer 330 of the next functional unit of the integrator block 304. An output of the multiplexer 332 is coupled to a data input of the flip flop 336. The flip flop 336 is clocked by the clock signal output from the programmable delay line. The output of the flip flop 336 is coupled to a low data input of the multiplexer 338. The output of the multiplexer 338 is used to control the corresponding delay element 318 as described below.

In the last functional unit (denoted with subscript "19") the multiplexer $330_{19}$ is arranged to receive the output of the flip flop $336_{18}$ of the preceding functional unit at a low data input. The high data input of the multiplexer $330_{19}$ is arranged to receive a low signal. The low signal may be set at 0V. An output of the multiplexer $330_{19}$ is coupled to a data input of the flip flop $334_{19}$ and to the high data input of the multiplexer $332_{18}$ of the preceding functional unit. The flip flop $334_{19}$ is clocked by the clock signal output from the programmable delay line via an inverter. The output of the flip flop $334_{19}$ is coupled to a high data input of the multiplexer $338_{19}$. The multiplexer $332_{19}$ is arranged to receive the output of the multiplexer $330_{18}$ of the preceding functional unit at a low data input. The high data input of the multiplexer $332_{19}$ is arranged to receive a low signal. The low signal may be set at 0V. An output of the multiplexer $332_{19}$ is coupled to a data input of the flip flop $336_{19}$. The flip flop $336_{19}$ is clocked by the clock signal output from the programmable delay line. The output of the flip flop $336_{19}$ is coupled to a low data input of the multiplexer $338_{19}$. The output of the multiplexer $338_{19}$ is used to control the last delay element $318_{19}$ as described below.

The clean clock signal from the clock signal generator 102 is coupled to a high data input of the multiplexer $322_0$ via the delay components $320_0$, and is also coupled to a low data input of the multiplexer $322_0$ not via the delay components $320_0$.

For the delay elements $318_1$ to $318_{19}$ the output of the multiplexer 322 of the previous delay element 318 is inverted and then coupled to a high data input of the multiplexer 322 and to a clock input of the flip flop 324 via the delay components 320, and is also coupled to a low data input of the multiplexer 322 not via the delay components 320. The output of the multiplexer $322_{19}$ is inverted and then output as the spread clock signal output from the programmable delay line. The multiplexers $322_n$ are controlled by the outputs from the corresponding multiplexers $338_n$.

The outputs from the NOT gates 340 and 342 are provided to first inputs of the OR gates 326 and 328 respectively. The output of the multiplexer $330_{19}$ is coupled to the second input of the OR gate 328 and the output of the flip flop $336_{19}$ is coupled to the second input of the OR gate 326. The output of the OR gate 326 is coupled to a second input of the OR gate 312. The output of the OR gate 328 is coupled to a second input of the XOR gate 316.

In operation, the LFSR 302 operates to provide a pseudo-random number. The operation of the LFSR 302 is known in the art and as such is not described in detail herein. The pseudo-random number takes a value of either 0 or 1. The flip flops 334 and 336 store a thermometer code that is guaranteed to change by exactly one step for every clock edge that passes through the delay line. A "thermometer code" means that a certain number of the flip flops 334 and 336 at the start of the sequence will store a value of 1 and then the remaining flip flops 334 and 336 at the end of the sequence will store a value of 0. The point in the sequence of flip flops 334 and 336 at which the value stored by the flip flop changes from 1 to 0 represents the delay value. By storing the delay value in the flip flops 334 and 336, the flip flops 334 and 336 act as the double-edge-triggered integrator 110.

The clean clock signal arrives at the first delay element $318_0$ of the programmable delay line and passes through the delay line to be output from the last delay element $318_{19}$. In each delay element 318 the clock signal is either delayed by the delay components 320 or not delayed by the delay components 320. Whether the clock signal is delayed with the delay components 320 is determined for each delay element 318 by controlling the multiplexer 322 to output either the clock signal having been delayed by the delay components 320 or the clock signal having not been delayed by the delay components 320. The multiplexer 322 is set in accordance with the value output from the multiplexer 338 of the corresponding functional unit of the integrator block 304. In this way the delay value stored as a thermometer code in the flip flops 334 and 336 can set the delay applied to the clock signal in the delay line.

Although a thermometer code is used in the embodiment described above, the flip flops 334 and 336 could store the delay value in a different manner provided that the delay value is represented by the number of flip flops 334 and 336 which store a high value (irrespective of the position of the flip flops in the sequence which store the high values).

The clock spreading circuit shown in FIG. 3 is arranged such that the thermometer code stored in the flip flops changes for each edge of the clock signal that passes through the delay line. When the values on both the control lines marked "value_to_integrateA" and "value_to_integrateB" are low (i.e. have a value of 0) then each edge of the clock signal is delayed by the delay components 320 in one more of the delay elements 318 than the previous edge of the clock signal was delayed by. This is because the multiplexers $330_n$ and $332_n$ pass the outputs of the flip flop $336_{n-1}$ and multiplexer $330_{n-1}$ of the preceding functional unit to the flip flops $334_n$ and $336_n$ respectively when the values on the "value_to_integrateA" and "value_to_integrateB" lines are low. Since the flip flops 334 and 336 store a thermometer code this means that the switching point of the thermometer code between the flip flops 334 and 336 storing a value of 1 and storing a value of 0 moves one functional unit further along the delay line (i.e., to the right in FIG. 3).

When the values on both the control lines marked "value_to_integrateA" and "value_to_integrateB" are high (i.e. have a value of 1) then each edge of the clock signal is delayed by the delay components 320 in one fewer of the delay elements 318 than the previous edge of the clock signal was delayed by. This is because the multiplexers $326_n$ $330_n$ and $332_n$ pass the outputs of the flip flop $336_{n+1}$ and multiplexer $330_{n+1}$ of the next functional unit to the flip flops $334_n$ and $336_n$ respectively when the values on the "value_to_integrateA" and "value_to_integrateB" lines are high. Since the flip flops 334 and 336 store a thermometer code this means that the switching point of the thermometer code between the flip flops 334 and 336 storing a value of 1 and storing a value of 0 moves one functional unit backwards along the delay line (i.e., to the left in FIG. 3).

When the values on the control lines marked "value_to_integrateA" and "value_to_integrateB" are different to each other (i.e. either 1 and 0 respectively or 0 and 1 respectively) then the delay applied to the edges of the clock signal alternately increases and decreases for each edge of the clock signal.

Since the clock signal output from the programmable delay line is passed to the LFSR block 302 via the divider block 306, the LFSR block 302 is updated only every N input clock edges in this embodiment. The value of N is programmable. N may, for example, always be an even number. In this way, the pulse labelled "Rpulse" in FIG. 3 is generated (or not generated) randomly every N clock cycles. If the pulse is generated then the direction of integration (i.e., increasing delay, or decreasing delay) is reversed. The illustrated embodiment of FIG. 3 beneficially divides down the clock feeding the LFSR block 302 so that the direction of delay integration changes (or not) only every N edges of the clock signal. For a 20 stage delay line (such as that shown in FIG. 3), a value of N=6 works best (meaning every 6 edges or every 3 clock periods). However under this scheme, the direction of integration is reversed whenever the delay reaches its maximum or minimum value. Setting N too low makes patterns with the same harmonics as the clean clock too probable. Setting N too high causes changes in the integration value to be governed too much by reaching the end of the minimum or maximum limits of the programmable delay line.

When the outputs of the flip flops $334_0$ and $336_0$ of the first functional unit are zero, the delay applied by the delay line is at a minimum. In this situation the values applied to the NOT gates 340 and 342 are low such that the outputs of the NOT gates supplied to the OR gates 236 and 238 are high. When the outputs of the flip flops $334_{19}$ and $336_{19}$ of the last functional unit are one, the delay applied by the delay line is at a maximum. In this situation the values applied to the second inputs of the OR gates 326 and 328 are high. Therefore in these situations the output of the OR gates 326 and 328 are high. This causes the signals on the "value_to_integrateA" and "value_to_integrateB" lines to be inverted. In this way the minimum/maximum delay signals indicate that integration in the current direction can no longer continue since the delay line has reached its minimum or maximum delay value.

Each identical stage (or delay element 318) of the delay line is inverting. Each stage delays rising and falling edges by approximately equal amounts. As described in the above embodiment, the flip flops 334 and 336 in the delay line stages store a thermometer code that is guaranteed to change by exactly one step for every clock edge that passes through the delay line. Due to the LFSR 302, the changes are pseudorandom except when the code reaches it extremal values. In this case, the delay is forced to change away from the extremal value. The delay line must be long enough to compensate for the effect of this non-random behaviour on noise spreading. It has been found that 20 delay stages (as shown in FIG. 3) are sufficient to suppress the $5^{th}$ and $7^{th}$ harmonics of the memory clock by 10 to 15 dB. Higher harmonics are spread more effectively.

All of the flip flops shown in FIG. 3 are reset asynchronously to '0' on power-on-reset, before the clock signal (clkin) is applied to the start of the delay line. The period of the clock signal must not be less than the total (maximum) delay line delay. The delay elements 318 illustrated have a delay of 100 ps but the delay of the delay elements could be up to 150 ps. A fixed supply voltage of 0.85V is applied to the clock spreading block shown in FIG. 3. As described above, every time a clock edge passes through the delay line, the next edge is randomly delayed by 1 step more or by one step less, thereby either incrementing or decrementing the delay applied to each edge of the clock signal. A step is equal to the delay of the delay components 320 in each of the delay elements 318. Thus, the maximum duty cycle distortion is equal to one delay step. The step size should not exceed ~3% of the cycle time. In this way the duty cycle distortion is maintained at a low level and also the jitter of the frequency of the clock signal is maintained at a low level. This helps to ensure that the spread clock signal can function correctly as a clock signal.

In one embodiment, the period of the spread clock signal will vary randomly between three values: the original cycle time T, T+2 delay steps and T−2 delay steps. Thus, if the magnitude of the delay step is 3% of the cycle time, then individual cycle times (i.e., periods of the spread clock signal) will vary by up to 6%. The processing block 106 (e.g., synchronous DRAM) receiving the spread clock signal must be capable of working with this slightly faster clock signal, and with the slightly slower clock signal.

In the described embodiment, the clock spreading block is designed to be placed on the output of a clock signal generator 102 (e.g., on the output of a memory clock divider for generating a clock signal for accessing a memory). The clock spreading block is powered from a fixed (0.85V) VDD rail and not from a core voltage supply (VDD) of the device. Unlike conventional implementations of SSFD, as described above, the clock spreading block described herein has no control over the clock signal generator (e.g., over the PLL of the clock signal generator). Instead, the clock spreading block works as a continuously varying delay line that effectively switches the clock frequency pseudo-randomly between two frequencies very close to the input frequency (e.g., between $0.94F_0$ and $1.06F_0$ as described above). To effect a change in frequency, it is necessary to continuously and linearly increase or decrease the delay. In the delay circuitry; changes to the delay do not coincide with clock edges (to avoid glitches). The total delay always changes by one delay step for every clock edge that passes through the circuit. The LFSR 302 output determines pseudo-randomly whether the delay is increased or decreased. If the delay is at its minimum or maximum setting, then it is increased or decreased respectively regardless of the LFSR. A minimum number of delay stages (e.g. 20) are necessary in order to mitigate the spectral effects of this shortcoming.

Figure 4:
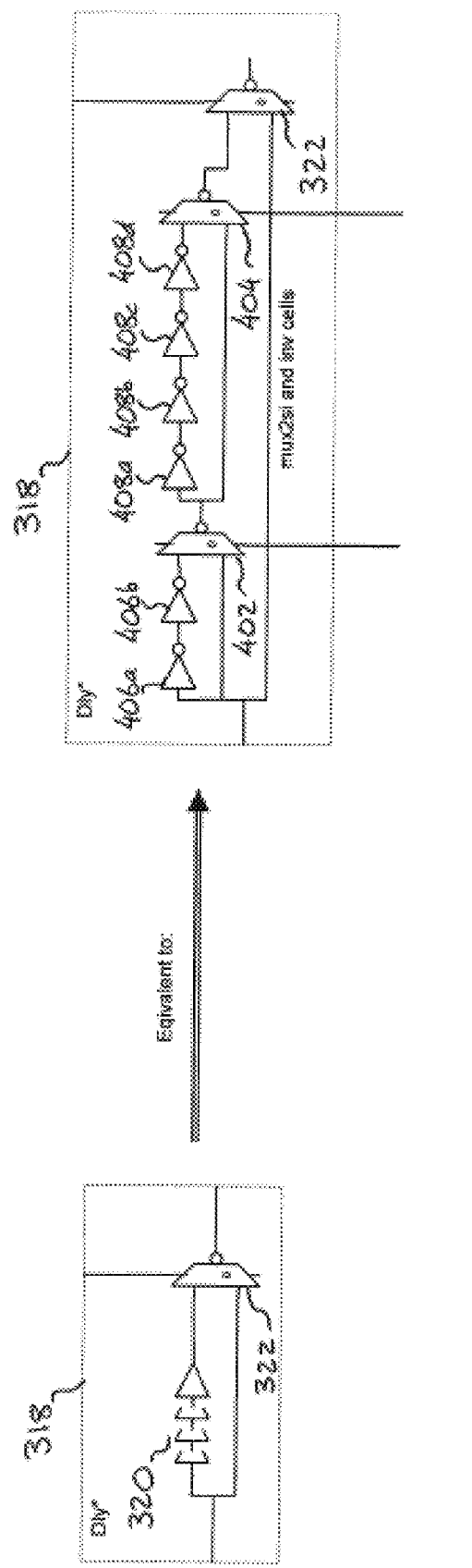
FIG. 4 illustrates a detailed circuit diagram of an embodiment of a delay element constructed according to the principles of the disclosure.

FIG. 4 is a detailed circuit diagram of an embodiment of one of the delay elements 318. Each of the delay elements 318 can be implemented as shown in FIG. 4. FIG. 4 shows that the delay components 320 are implemented using a first multiplexer 402, a second multiplexer 404, a first set of inverters 406a and 406b and a second set of inverters 408a to 408d. The low data input of the first multiplexer 402 is coupled to the output from the multiplexer 322 of the previous delay element. The high data input of the first multiplexer 402 is coupled to the output from the multiplexer 322 of the previous delay element via the inverters 406a and 406b which are arranged in series. The output of the first multiplexer 402 is inverted and coupled to a low data input of the second multiplexer 404. The inverted output of the first multiplexer 402 is also coupled to a high data input of the second multiplexer 404 via the inverters 408a to 408d which are arranged in series. The output of the second multiplexer 404 is inverted and coupled to the high data input of the multiplexer 322.

The control inputs to the multiplexers 402 and 404 are statically controlled, such that they do not change during the operation of the clock spreading block. The control inputs are set to be the same for all of the delay elements 318 such that the delays introduced by each of the delay elements 318 are equal. The inverters 406a, 406b and 408a to 408d introduce a delay to the signal that passes through them. Each inverter introduces the same delay. The magnitude of the delay introduced by each delay element 318 can be adjusted by setting the multiplexers 402 and 404 accordingly. For example, setting the control inputs applied to both multiplexers 402 and 404 to a low value results in no delay being applied to the clock signal by the delay components 320. Setting the control input applied to multiplexer 402 to a high value and setting the control input applied to multiplexer 404 to a low value results in the delay components 320 delaying the clock signal with two of the inverters (406a and 406b but not 408a to 408d). Setting the control input applied to multiplexer 402 to a low value and setting the control input applied to multiplexer 404 to a high value results in the delay components 320 delaying the clock signal with four of the inverters (408a to 408d but not 406a and 406b). Setting the control inputs applied to both multiplexers 402 and 404 to a high value results in the delay components 320 delaying the clock signal with all six of the inverters (406a, 406b and 408a to 408d). It can therefore be appreciated that by setting the values of the control inputs to the multiplexers 402 and 404 the magnitude of the steps (i.e. the increments and decrements of the delay) applied to the clock signal by the delay line can be adjusted. A skilled person would appreciate that increasing the magnitude of the steps will result in a greater spreading of the clock signal, but will also increase the jitter and duty cycle distortion of the spread clock signal. Therefore, the delay step can be adjusted to find a compromise between the amount of spreading required and the amount of clock jitter and duty cycle distortion that can be tolerated by the processing block 106 that is to use the spread clock signal.

Figure 6A:
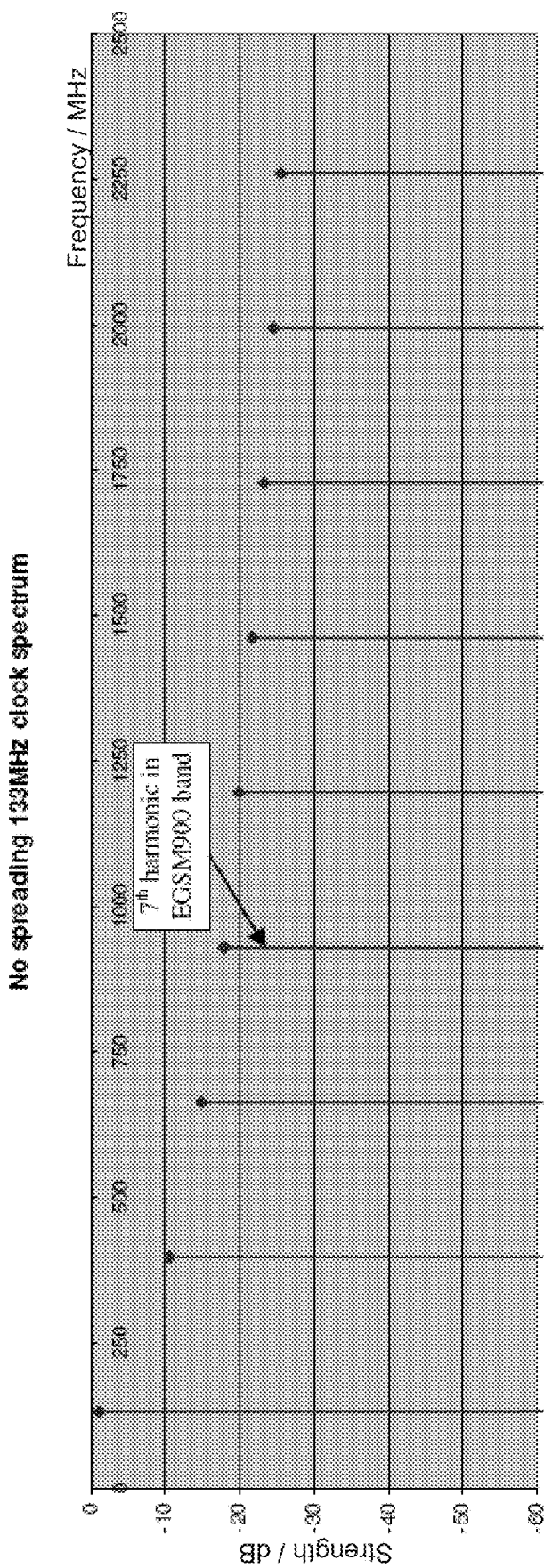
FIG. 6a illustrates a graph showing a first clock spectrum.

FIGS. 6a to 8e show graphs of clock spectrums in various different situations. FIG. 6a shows the spectrum of the clean clock signal generated by the clock signal generator 102. It can be seen that the peaks in the spectrum are narrow and have high strength. In particular it can be seen that the $3^{rd}$, $5^{th}$ and $7^{th}$ harmonics have peak strengths above −20 dB. As highlighted in FIG. 6a the $7^{th}$ harmonic of a 133 MHz clock signal falls into the bandwidth of the EGSM900 band which is used for transmission of signals according to the GSM standard. Therefore the $7^{th}$ harmonic of the 133 MHz clean clock signal shown in FIG. 6a will cause high levels of interference in the EGSM900 band.

Figure 6B:
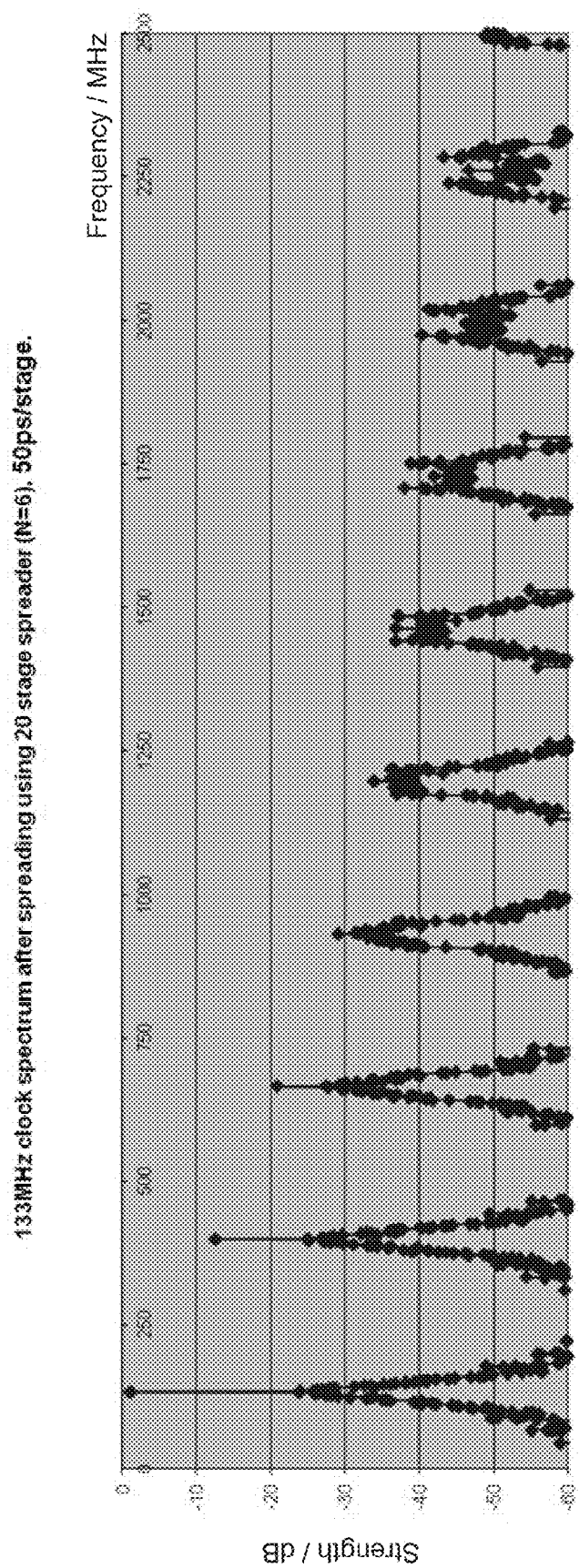
FIG. 6b illustrates a graph showing a second clock spectrum.

FIG. 6b shows the spectrum of a spread clock signal which has been spread using the 20 stage clock spreading block shown in FIG. 3 when the delay components of each delay element introduce a delay of 50 ps with N=6. It is immediately apparent by comparing FIGS. 6a and 6b that the peaks of the harmonics of the clock signal have been spread (i.e. they are cover a wider bandwidth) and have a lower peak strength. In particular, the strength of the $7^{th}$ harmonic of the spread clock signal shown in FIG. 6b is approximately 10 dB lower than the $7^{th}$ harmonic of the clean clock signal. Therefore the interference in the EGSM900 band caused by the $7^{th}$ harmonic of the spread clock signal shown in FIG. 6b is less than that caused by the $7^{th}$ harmonic of the clean clock signal.

Figure 6C:
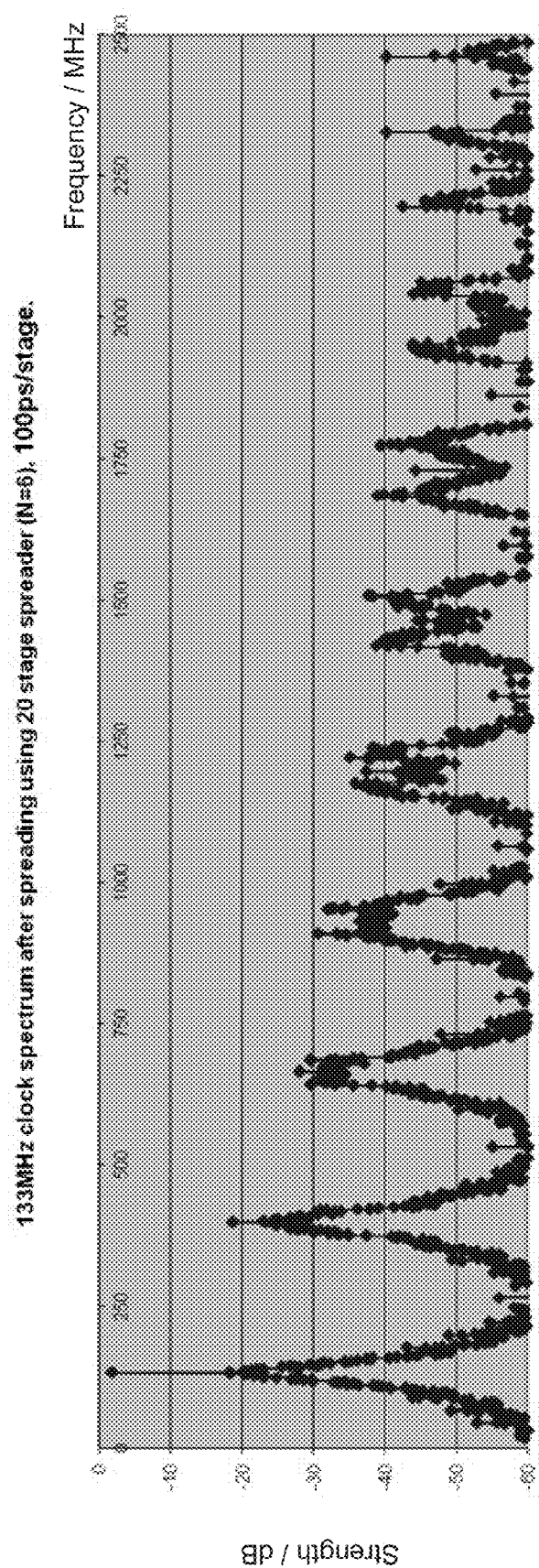
FIG. 6c illustrates a graph showing a third clock spectrum.

FIG. 6c shows the spectrum of a spread clock signal which has been spread using the 20 stage clock spreading block shown in FIG. 3 when the delay components of each delay element introduce a delay of 100 ps with N=6. Increasing the delay of each step in the delay line has increased the spreading of the clock signal. As can be seen by comparing FIGS. 6b and 6c the peaks of the harmonics of the clock signal are wider and have a lower peak strength when the delay of the delay components 320 is 100 ps as compared to when the delay of the delay components 320 is 50 ps. This extra spreading means that even less interference will be experienced in the GSM bands such as the EGSM900 band described above. In fact it can be seen that the strength of the $7^{th}$ harmonic of the spread clock signal in FIG. 6c is approximately 20 dB lower than the $7^{th}$ harmonic of the clean clock signal. As described above, this extra spreading comes at a cost of increased jitter and duty cycle distortion to the clock signal.

Figure 7A:
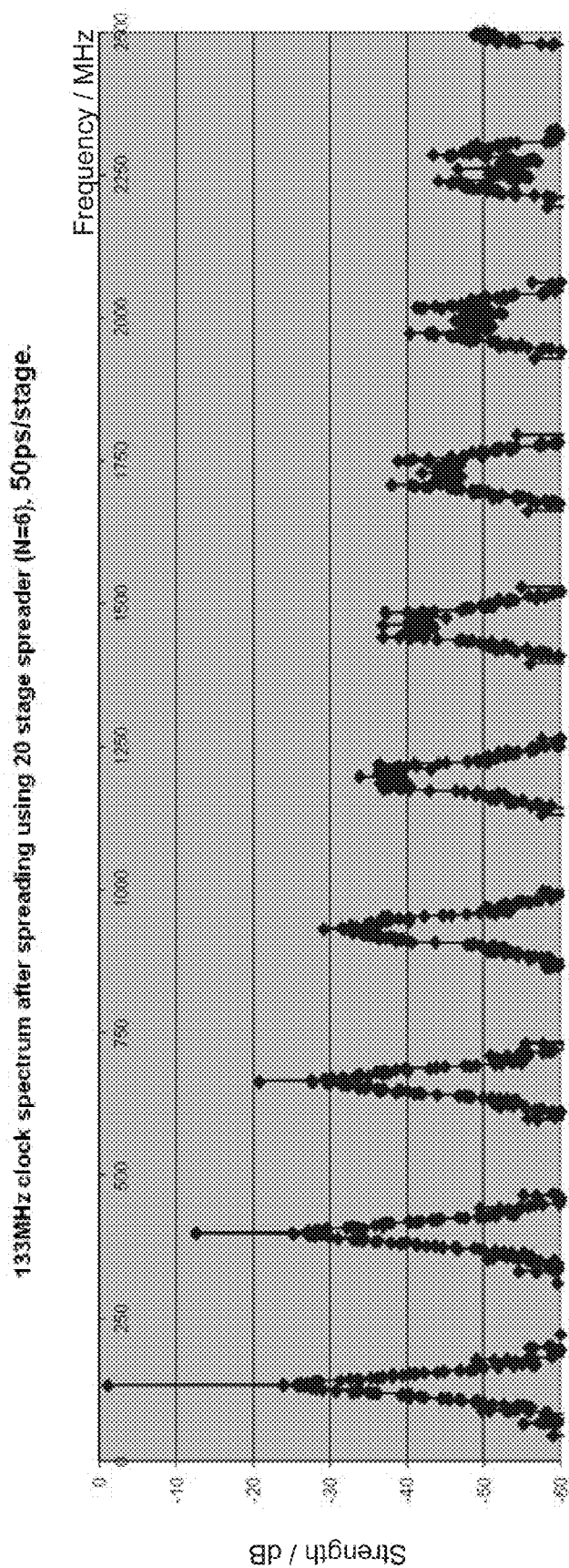
FIG. 7a illustrates a graph showing a fourth clock spectrum.
Figure 7B:
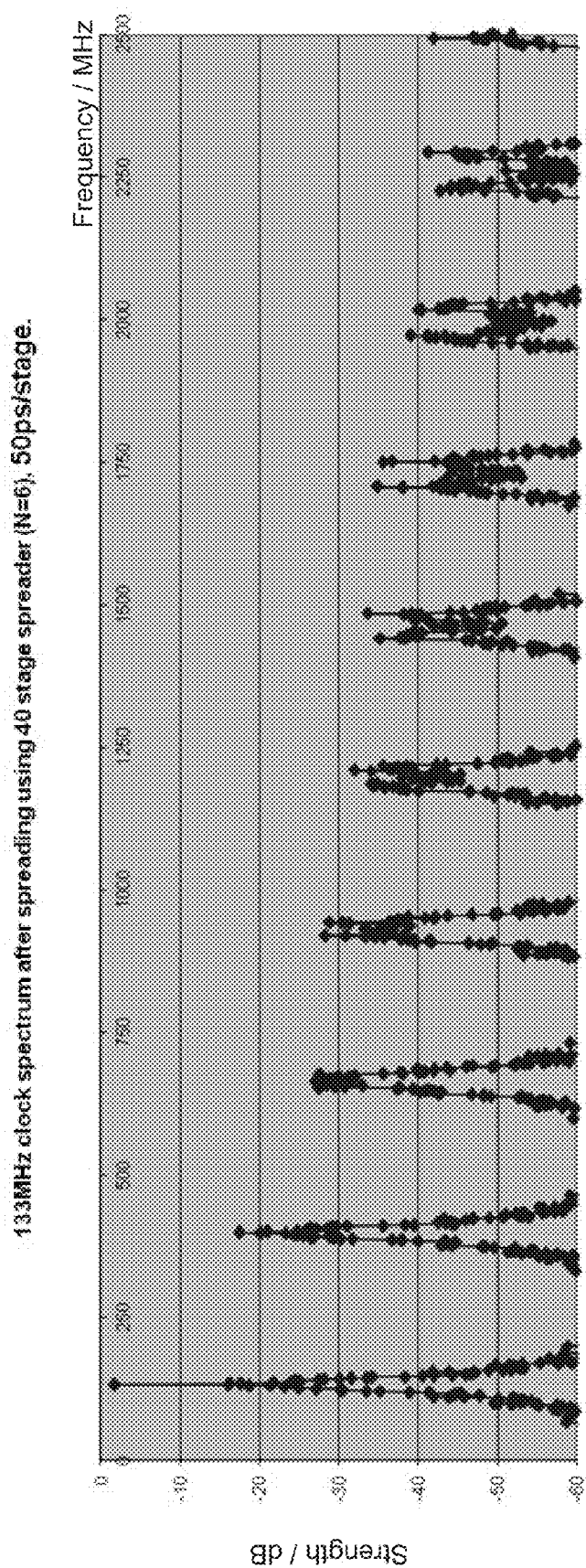
FIG. 7b illustrates a graph showing a fifth clock spectrum.

FIGS. 7a and 7b show how the spectrum of the spread clock signal changes as the number of delay elements 318 in the delay line is changed. FIG. 7a shows the spectrum of a spread clock signal which has been spread using a 20 stage clock spreading block when the delay components of each delay element introduce a delay of 50 ps with N=6. FIG. 7a therefore matches FIG. 6b. FIG. 7b shows the spectrum of a spread clock signal which has been spread using a 40 stage clock spreading block shown in FIG. 3 when the delay components of each delay element introduce a delay of 50 ps with N=6. It can be seen that the 40 stage delay line results in the spread clock signal having harmonics with lower peak strengths than a 20 stage delay line. However, the longer the delay line the greater the complexity of the clock spreading block, so it may be beneficial to keep the number of delay elements low (e.g. at 20). Furthermore, the longer the delay line the greater the total delay of the delay line, and since the total delay of the delay line should be less than the period of the clock signal it is beneficial to keep the total delay of the delay line low. This allows the clock spreading block to be used with high frequency clock signals.

Figure 8A:
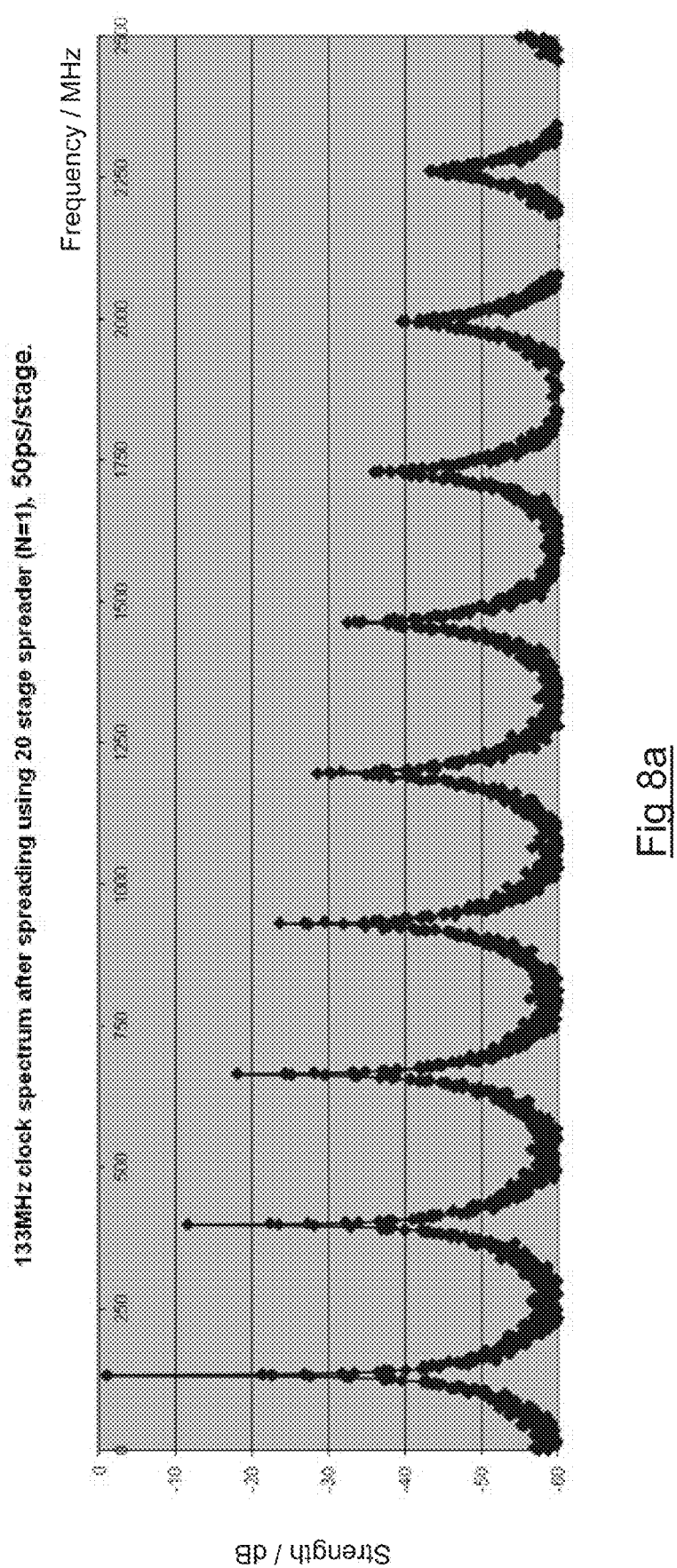
FIG. 8a illustrates a graph showing a sixth clock spectrum.
Figure 8B:
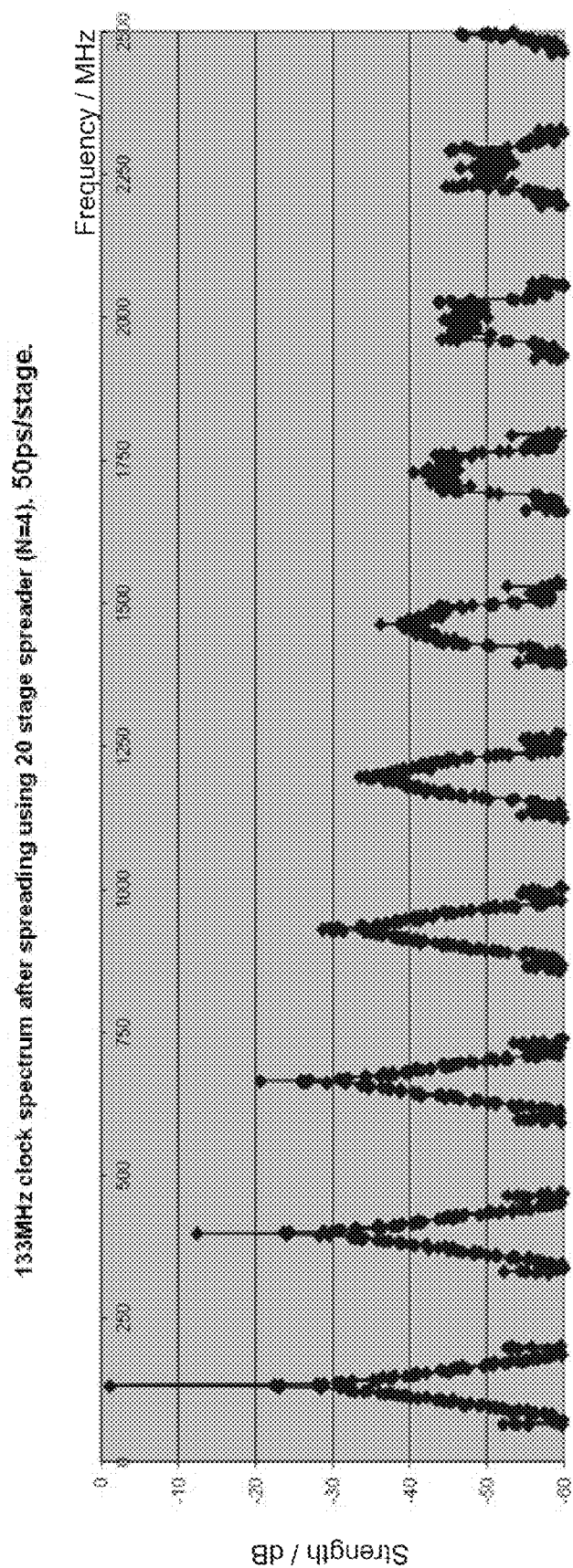
FIG. 8b illustrates a graph showing a seventh clock spectrum.
Figure 8C:
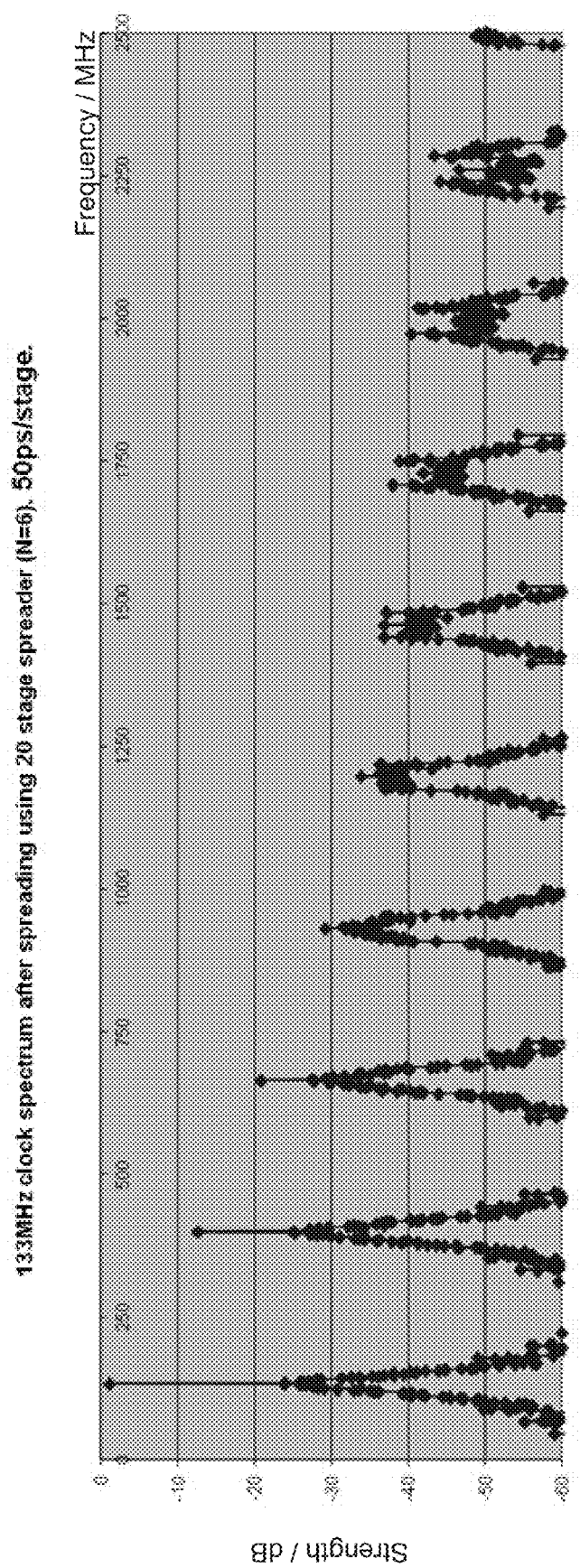
FIG. 8c illustrates a graph showing an eighth clock spectrum.
Figure 8D:
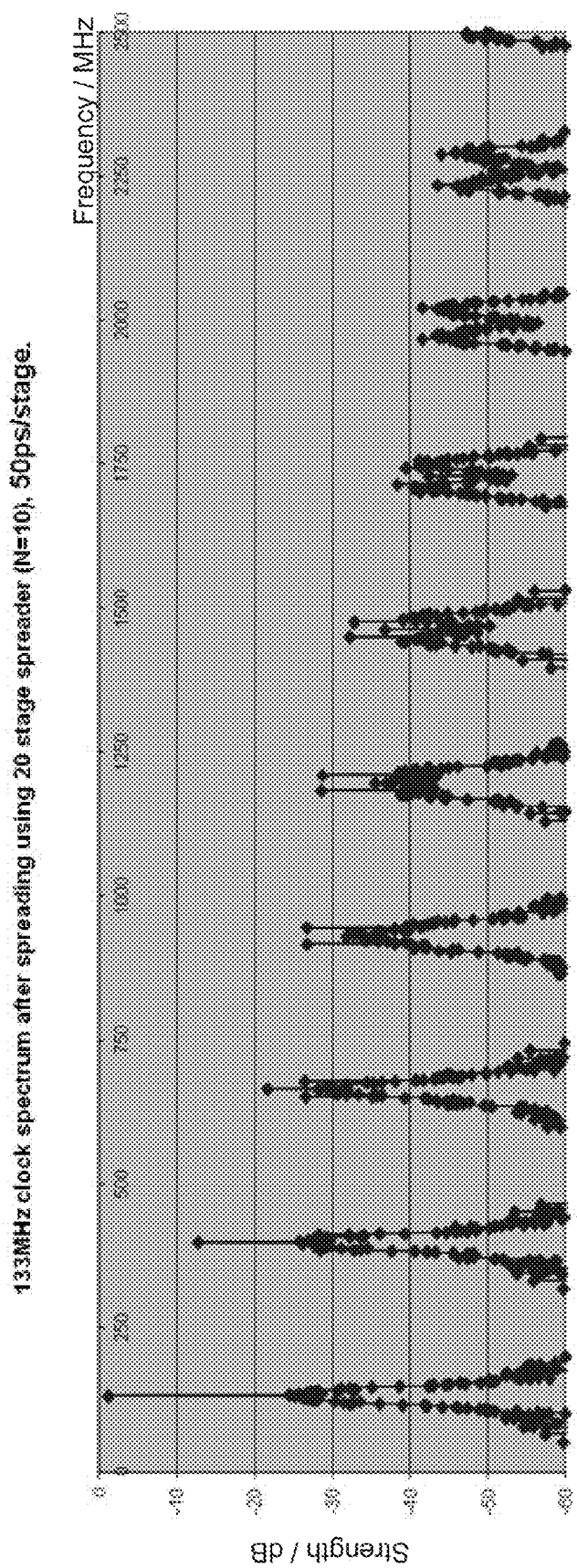
FIG. 8d illustrates a graph showing a ninth clock spectrum.
Figure 8E:
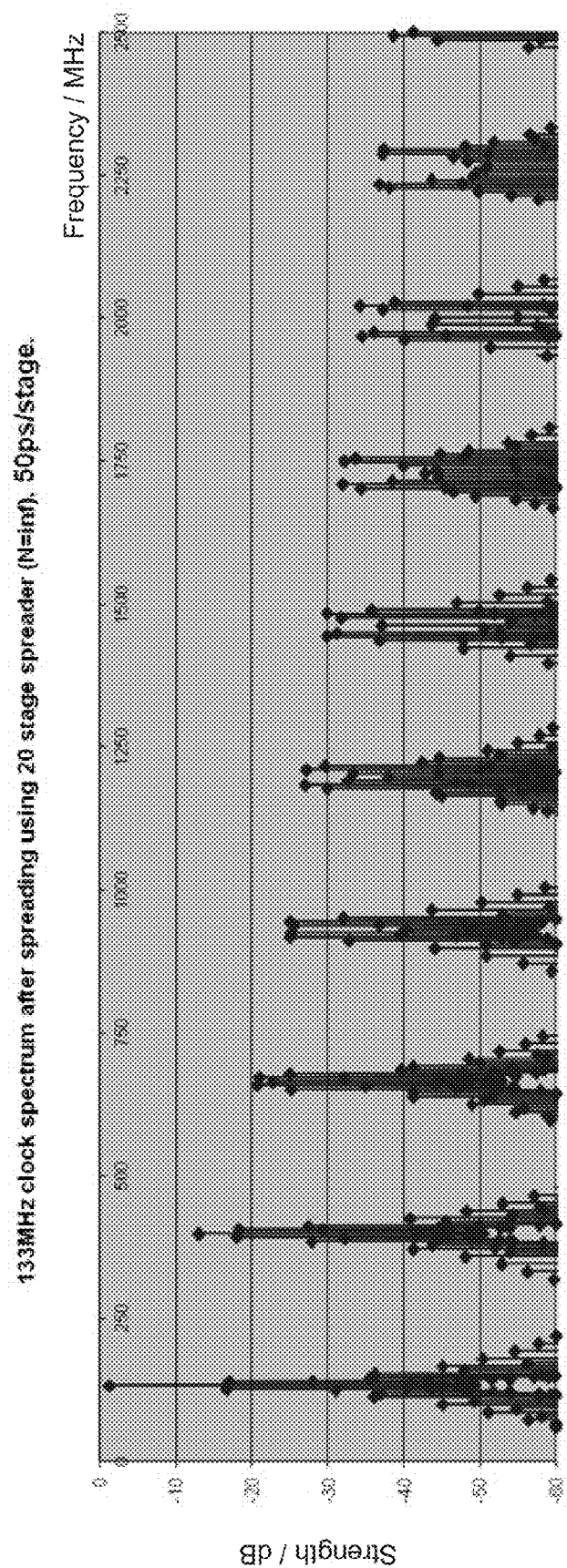
FIG. 8e illustrates a graph showing a tenth clock spectrum.

FIGS. 8a to 8e show how the spectrum of the spread clock signal changes as the value of N in the divider block 306 is changed. FIG. 8a shows the spectrum of a spread clock signal which has been spread using a 20 stage clock spreading block when the delay components of each delay element introduce a delay of 50 ps with N=1. FIG. 8b shows the spectrum of a spread clock signal which has been spread using a 20 stage clock spreading block when the delay components of each delay element introduce a delay of 50 ps with N=4. FIG. 8c shows the spectrum of a spread clock signal which has been spread using a 20 stage clock spreading block when the delay components of each delay element introduce a delay of 50 ps with N=6. FIG. 8d shows the spectrum of a spread clock signal which has been spread using a 20 stage clock spreading block when the delay components of each delay element introduce a delay of 50 ps with N=10. FIG. 8e shows the spectrum of a spread clock signal which has been spread using a 20 stage clock spreading block when the delay components of each delay element introduce a delay of 50 ps with N=∞. It can be seen from FIGS. 8a to 8e that there is a general trend that as N increases the peaks of the spectrum widen, i.e. spread out to a greater extent.

The clock spreading block described herein can be particularly useful in devices which communicate over a wireless network (e.g. a GSM network) to reduce the interference caused by the harmonics of the clock signal. Other methods for reducing interference caused by harmonics of the clock signal may not be easily scaled down in size, but the clock spreading block described herein is simple to implement in small devices, such as mobile telephones, in which the components in the device are very close together. Furthermore, since the clock spreading block described herein is separate from the clock signal generator, it can be added to existing devices as a distinct block (or "widget") to thereby reduce the interference (or "noise") resulting from the harmonics of the clock signal. For example, the interference resulting from the harmonics of the clock signal may be reduced by 10 dB by including the clock spreading block in the device. Multiple clock spreading blocks can be implemented in a device to spread the clean clock signal by different amounts for different purposes in the device.

In the embodiments described above, the integrator 110 is clocked on every edge of the clock signal, such that the delay of the delay line changes for every edge of the clock signal.

However, in alternative embodiments the integrator 110 may be clocked less frequently than this. However, if the integrator 110 is clocked on alternate edges (i.e. every other edge) of the clock signal, such that the delay of the delay line changes for alternate edges of the clock signal, this may introduce extra interference components into the spread clock signal and may adversely affect the duty cycle of the spread clock signal.

In the embodiments described above, the integrator 110 (implemented using the flip flops 324 in FIG. 3) is used to store the delay value. However, in other embodiments, the delay value could be stored in other ways which may not use an integrator. For example, a register in the device 100 could be used to store the delay value.

In the embodiments described above, the clock spreading block operates in the digital domain. In this way the random number generator 112 outputs either a 1 or a 0 which is used to increment or decrement the delay value stored in the integrator 110 to thereby set the number of delay elements which are applied to the clock signal in the delay line 108. However, in alternative embodiments, the clock spreading block could operate in the analogue domain. In these alternative embodiments the random number could output a random number which is not constrained to being either 0 or 1 and could instead take any analogue value between 0 and 1 for example. The delay value stored in the integrator 110 could be stored as an analogue value and could be varied according to the analogue random number. The analogue delay value could then be applied to vary the delay of the delay line in an analogue manner. For example, the delay line may apply a delay to the clock signal based on a voltage value applied to the delay line. By varying the voltage value in accordance with the delay value stored in the integrator 110 the delay applied by the delay line to the clock signal could be varied in an analogue manner.

While various embodiments have been disclosed herein, it will be understood to those skilled in the art that various changes in form and detail may be made without departing from the scope of the disclosure as defined by the appended claims.

The invention claimed is:

1. A method of spreading a clock signal, the method comprising:
   receiving the clock signal at an input of a variable delay line, said clock signal having been generated by a clock signal generator;
   for each edge of the clock signal, setting the delay introduced by the variable delay line in accordance with a stored delay value;
   for each of a plurality of consecutive edges of the clock signal, either incrementing or decrementing the stored delay value based on a randomly generated value for that edge; and
   outputting a spread version of the clock signal from an output of the variable delay line, wherein each edge of the spread version of the clock signal is delayed by the respective delay that is set for that edge of the clock signal.

2. The method of claim 1 wherein said plurality of consecutive edges comprises each edge of the clock signal, such that the delay introduced by the variable delay line is changed for each edge of the clock signal.

3. The method of claim 1 further comprising randomly generating the randomly generated value for each of the plurality of consecutive edges of the clock signal.

4. The method of claim 1 further comprising randomly generating the randomly generated value for a set of the plurality of consecutive edges of the clock signal.

5. The method of claim 4 wherein said set comprises N of said plurality of consecutive edges of the clock signal, where N is greater than one and less than the value of the stored delay value corresponding to the maximum delay of the variable delay line.

6. The method of claim 5 wherein the value of the stored delay value corresponding to the maximum delay of the variable delay line is twenty and N is six.

7. The method of claim 1 wherein the stored delay value is stored by an integrator.

8. The method of claim 1 wherein the period of the clock signal received at the input of the variable delay line is greater than the delay introduced by the variable delay line.

9. The method of claim 1 wherein the magnitude of a change to the delay of the variable delay line resulting from an increment or a decrement to the stored delay value does not exceed 3% of the period of the clock signal received at the input of the variable delay line.

10. The method of claim 1 further comprising adjusting the magnitude of a change to the delay of the variable delay line that results from an increment or a decrement to the stored delay value.

11. The method of claim 1 wherein
   for said plurality of consecutive edges of the clock signal, if the stored delay value corresponds to the maximum delay of the variable delay line then the stored delay value is decremented irrespective of the randomly generated value, and wherein
   for said plurality of consecutive edges of the clock signal, if the stored delay value corresponds to the minimum delay of the variable delay line then the stored delay value is incremented irrespective of the randomly generated value.

12. The method of claim 1 wherein the variable delay line and the stored delay value are implemented in the digital domain.

13. The method of claim 1 wherein the variable delay line and the stored delay value are implemented in the analogue domain.

14. Circuitry configured to spread a clock signal, the circuitry comprising:
   (i) a variable delay line comprising:
      an input for receiving the clock signal, said clock signal having been generated by a clock signal generator;
      setting circuitry configured to set, for each edge of the clock signal, a delay introduced by the variable delay line in accordance with a stored delay value; and
      an output for outputting a spread version of the clock signal, wherein each edge of the spread version of the clock signal is delayed by the respective delay that is set for that edge of the clock signal; and
   (ii) a store configured to store the delay value, wherein the circuitry is configured such that for each of a plurality of consecutive edges of the clock signal the stored delay value is either incremented or decremented based on a randomly generated value for that edge.

15. The circuitry of claim 14 further comprising random value generating circuitry configured to randomly generate the randomly generated value for each of the plurality of consecutive edges of the clock signal.

16. The circuitry of claim 14 further comprising random value generating circuitry configured to randomly generate the randomly generated value for a set of the plurality of consecutive edges of the clock signal.

17. The circuitry of claim 15 wherein the random value generating circuitry comprises a pseudo-random number generator, such that said randomly generated value is a pseudo-random number.

18. The circuitry of claim 17 wherein the random value generating circuitry is a linear feedback shift register.

19. The circuitry of claim 14 wherein the store is an integrator.

20. The circuitry of claim 19 wherein the integrator comprises a sequence of flip flops configured to store the delay value as a thermometer code.

21. The circuitry of claim 14 wherein the variable delay line comprises adjusting circuitry configured to adjust the magnitude of a change to the delay of the variable delay line that results from an increment or a decrement to the stored delay value.

22. The circuitry of claim 14 wherein the variable delay line and the store are implemented in the digital domain.

23. The circuitry of claim 14 wherein the variable delay line and the store are implemented in the analogue domain.

24. A device comprising:
a clock signal generator; and
circuitry, said circuitry including:
 (i) a variable delay line comprising:
  an input for receiving the clock signal, said clock signal having been generated by a clock signal generator;
  setting circuitry configured to set, for each edge of the clock signal, a delay introduced by the variable delay line in accordance with a stored delay value; and
  an output for outputting a spread version of the clock signal, wherein each edge of the spread version of the clock signal is delayed by the respective delay that is set for that edge of the clock signal; and
 (ii) a store configured to store the delay value, wherein the circuitry is configured such that for each of a plurality of consecutive edges of the clock signal the stored delay value is either incremented or decremented based on a randomly generated value for that edge.

25. The device of claim 24 further comprising a processing block configured to receive the spread version of the clock signal output from the variable delay line for use as a clock signal in the processing block.

* * * * *